United States Patent
Ravada et al.

(10) Patent No.: US 8,269,764 B2
(45) Date of Patent: Sep. 18, 2012

(54) THREE DIMENSIONAL SPATIAL ENGINE IN A RELATIONAL DATABASE MANAGEMENT SYSTEM

(75) Inventors: Siva Ravada, Nashua, NH (US); Ravi Kothuri, Nashua, NH (US); Baris M. Kazar, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 1024 days.

(21) Appl. No.: 11/906,785

(22) Filed: Oct. 3, 2007

(65) Prior Publication Data

US 2009/0091568 A1    Apr. 9, 2009

(51) Int. Cl.
*G06T 15/00*    (2011.01)

(52) U.S. Cl. ........ 345/419; 345/420; 345/421; 345/427; 345/619; 345/629; 707/100

(58) Field of Classification Search ............ 345/419, 345/420, 421, 427, 629, 619; 707/100
See application file for complete search history.

(56) References Cited

U.S. PATENT DOCUMENTS

| | | | |
|---|---|---|---|
| 6,912,293 B1 * | 6/2005 | Korobkin ................ 382/100 |
| 7,353,114 B1 * | 4/2008 | Rohlf et al. ................ 702/5 |
| 7,746,343 B1 * | 6/2010 | Charaniya et al. ........... 345/428 |
| 7,933,395 B1 * | 4/2011 | Bailly et al. ............. 379/201.04 |
| 2003/0225513 A1 * | 12/2003 | Gagvani et al. ............... 701/211 |
| 2007/0130112 A1 * | 6/2007 | Lin .................................... 707/2 |
| 2008/0281839 A1 * | 11/2008 | Bevan et al. ................. 707/100 |
| 2010/0223276 A1 * | 9/2010 | Al-Shameri et al. .......... 707/769 |

OTHER PUBLICATIONS

Charaniya et al. (7,746,343) in view of Mandorli et al. "Modeling with self validation features", ACM/IEEE 1997.*
Zlatanova et al. "Toological models and frameworks for 3D spatial objects"; published 2004.*
Kothuri et al., Overview of the 3-D Spatial Server in Oracle, VLDB'07, Sep. 23-28, 2007, pp. 1-7, VLDB Endowment, Vienna, Austria.

\* cited by examiner

*Primary Examiner* — Kimbinh T Nguyen
(74) *Attorney, Agent, or Firm* — Kraguljac Law Group, LLC

(57) ABSTRACT

Systems, methodologies, media, and other embodiments associated with a three dimensional spatial engine in an RDBMS are described. One example system includes logic to receive and store data representing a set of spatial features of a three dimensional geometry object. The example system may also include logic to validate the three dimensional geometry object and to provide a signal concerning the validity of the object.

38 Claims, 7 Drawing Sheets

THREE DIMENSIONAL SPATIAL ENGINE IN A RELATIONAL DATABASE MANAGEMENT SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Conventionally, Geographic Information Systems (GIS) used two-dimensional spatial data to represent terrestrial objects (e.g., the shapes of buildings, administrative boundaries). Advances in computer storage and visualization tools have permitted the use of more advanced three dimensional representations of terrestrial objects. However, conventional systems utilizing these three dimensional representations may have been suboptimal in efficiency and scalability. In particular, validation of geometric representations in conventional systems employing three dimensional models may have been incomplete and/or ambiguous.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
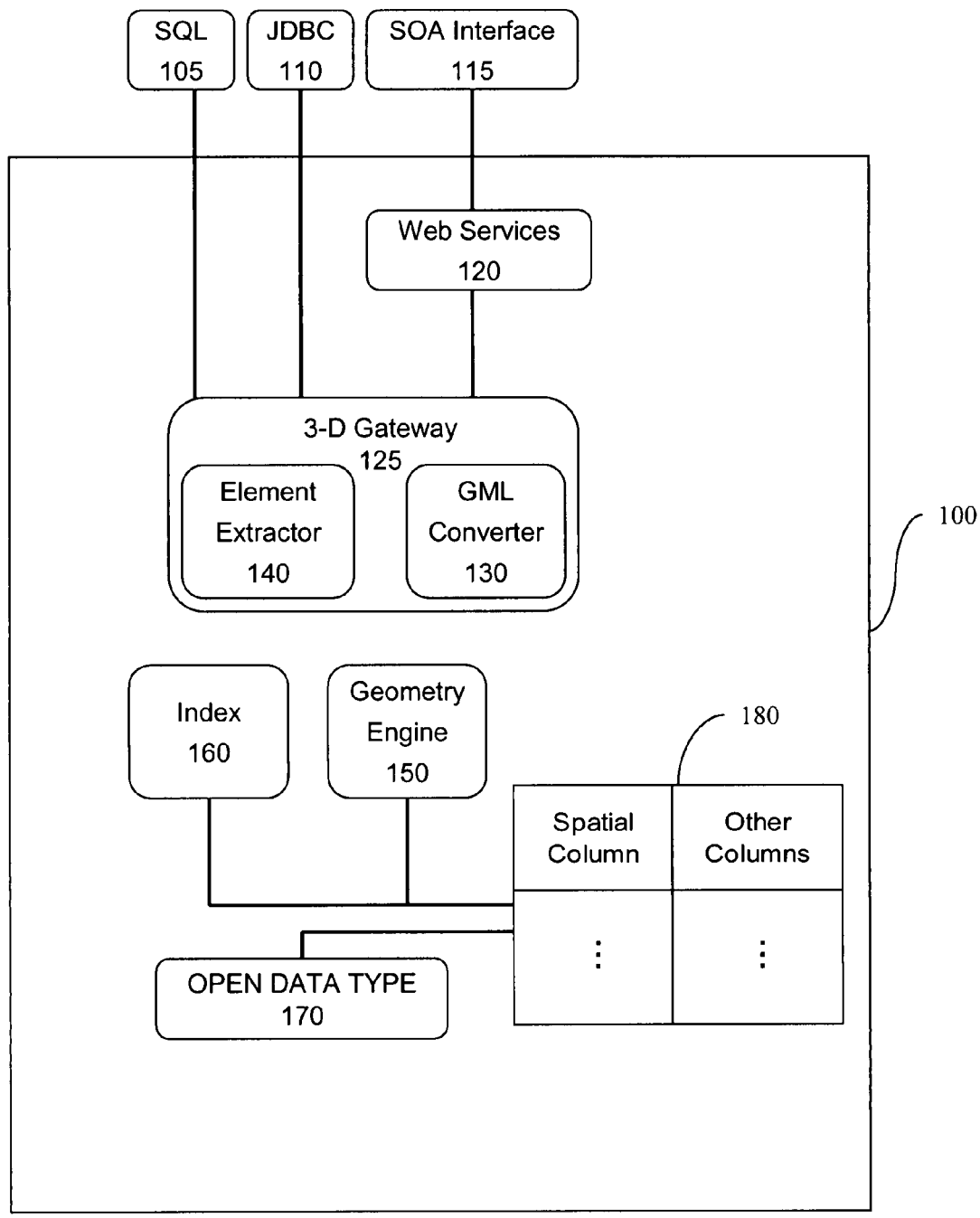
FIG. 1 illustrates an example three dimensional spatial engine associated with a relational database management system (RDBMS).

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a non-transitory medium that participates in directly or indirectly providing signals, instructions and/or data. A computer-readable medium may take forms, including, but not limited to, non-volatile media, and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, and other media from which a computer, a processor, or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software in execution, and/or combinations thereof to perform a function(s) or an action(s), and/or to cause a function or action from another logic, method, and/or system. For example, based on a desired application or needs, logic may include a software controlled microprocessor, discrete logic (e.g., application specific integrated circuit (ASIC)), an analog circuit, a digital circuit, a programmed logic device, a memory device containing instructions, and so on. Logic may include one or more gates, combinations of gates, or other circuit components. Logic may also be fully embodied as software stored on a non-transitory computer-readable medium. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., structured query language (SQL)), an object query language (OQL), and so on. A query may be implemented in computer code (e.g., C#, C++, Javascript) that can be employed to gather information from various data stores and/or information sources.

"RDBMS" as used herein refers to a relational database management system.

"Signal", as used herein, includes but is not limited to, one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms (e.g., routines, modules, methods, threads). Software may also be implemented in a variety of executable and/or loadable forms (e.g., a stand-alone program, a function call (local and/or remote), a servelet, an applet, instructions stored in a memory, and so on). Software, whether an entire system or a component of a system, may be embodied as an article of manufacture and maintained or provided as part of a computer-readable medium as defined previously.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, displaying, and so on, refer to actions and processes of a computer system, logic, processor, or similar electronic device that manipulates and transforms data represented as physical (electronic) quantities.

FIG. 1 illustrates a three dimensional spatial server system 100. Spatial server system 100 may be a three dimensional spatial engine associated with a relational database management system (RDBMS). System 100 may receive data representing a geometric characteristic(s) of a three dimensional object. System 100 may interact with an instance of an open data type 170 (e.g., SDO_GEOMETRY) that may be referred to, for example, as a geometry. Instances of this open data type 170 may be used to store data representing the geometric characteristics of the three dimensional object. Open data type 170 may facilitate specifying a coordinate system for the three dimensional data. Instances of the data type 170 may also be used to store data representing the geometric characteristics of the three dimensional object in a database 180.

The system 100 may include a geometry engine 150. The geometry engine 150 may compute geometric properties of three dimensional objects. Geometric properties computed may include, for example, length, area, volume, and so on. When computing volume, the system 100 and/or geometry engine 150 may decompose a first set of geometries into a second set of geometries and then make determinations and calculations using the second set. For example, geometry engine 150 may decompose complicated geometries (e.g., geometries with holes) into simpler geometries. When processing the complicated geometries, inner solid geometries may have negative volumes whereas outer solid geometries may have positive volumes.

The geometry engine 150 may also compute geometric relationships (e.g., distance, intersection) between objects. For example, an interaction function may determine whether two geometries intersect. The geometry engine 150 may determine intersection between geometries incorporating inner geometries (e.g., inner cores, inner holes). R-trees may be constructed on different sub-elements of the geometries and used to eliminate the non-interacting parts of the input geometries, thus ensuring scalability with the complexity of the geometries. A distance query may identify geometries that are within a specified distance from a reference (e.g., query) object. Additionally, a neighbor or nearest query may identify geometries that are near the reference (e.g., query) object.

The geometry engine 150 may also compute other types of topological relationships including whether an object is inside another object, whether two objects touch, and so on. The geometry engine 150 may incorporate transformation functions including rotation and translation of a three dimensional object. In addition, the geometry engine 150 may also provide an extrusion function to convert a two dimensional representation of an object to a three dimensional representation. The extrusion result may depend on input of the heights of the vertices of the three dimensional object.

The geometry engine 150 may validate geometry objects. The geometry objects may include three dimensional objects (e.g., surfaces, solids, collections). Validation may be based, for example, on processing data representing the geometric characteristics of the object and a set of validation rules. The system may provide specific validation rules for the different spatial elements of geometry objects. Theorems and proofs upon which example validation rules are based are provided below.

Surfaces are the building blocks for defining solids. Solids may be defined by both outer and inner boundaries. Surfaces may include rings, polygons, composite surfaces, and so on. A ring can be defined as a closed string of connected non-intersecting lines that lie on the same plane. A ring R is typically specified as the sequence of n+1 vertices $R=<V_1, V_2, \ldots, V_n, V_1>$ where the first and the $(n+1)^{th}$ vertex are the same (to make the ring closed). Other vertices in the ring are distinct. Pairs $<V_i, V_{i+1}>$ represent a directed edge connecting the vertex $V_i$ to $V_{i+1}$. No two edges of the ring are to intersect except the first edge $<V_1, V_2>$ and the last edge $<V_n, V_1>$ that can touch at vertex $V_1$. This property may be referred to as no self intersection.

System 100 and/or geometry engine 150 may validate a ring. The validation may involve processing a number of rules. The rules may include, for example, a closedness test, a planarity test, a non-intersecting of edges test, and a distinct vertex test. The closedness test validates when the first and last vertices of the ring are identical. The planarity test validates when all vertices of the ring are on the same plane. In one example, being on the same plane may include points that are within a planarity-tolerance error. The non-intersecting of edges test validates when edge $e_i$ connects vertex $<V_i, V_{i+1}>$ and edge $e_j$ connects $<V_j, V_{j+1}>$, and $e_i$ and $e_j$ have the following properties: If (j=i+1 mod n), then $e_i$ and $e_j$ only touch at vertex $V_j$. Otherwise, $e_i$ and $e_j$ do not intersect. The distinct vertex test validates when adjacent vertices $V_i$, $V_{i+1}$ do not represent the same point in space. $V_i$, $V_{i+1}$ are considered duplicates of the same point if the distance between $V_i$ and $V_{i+1}$ is less than a tolerance error.

A polygon may be defined as a single contiguous area in a planar space bounded by one outer or exterior ring $PR_e$ as the exterior boundary, and zero or more inner or interior rings $PR_{i1}, \ldots PR_{ik}$ which are interior to the outer ring and non-overlapping with one another. System 100 and/or geometry engine 150 may validate a polygon. The validation may involve processing a number of rules. The rules may include, for example, a validity of rings test, a co-planarity of rings test, a proper orientation test, a single contiguous area test, a non-overlapping inner rings test, and an inner-outer disjointness test.

The validity of rings test validates when the rings in a polygon are valid. That is, all rings in the polygon satisfy closedness, planarity, no self-intersection, and distinct vertex tests. The co-planarity of rings test validates when all rings are on the same plane within a tolerance. The proper orientation test validates when inner rings have the opposite orientation compared to an associated outer ring. The single contiguous area test validates when inner rings do not partition the polygon into disjoint areas. The non-overlapping inner rings test validates when inner rings do not overlap with each other within a tolerance. Inner rings may, however, touch at a point. The inner-outer disjointness test validates when all inner-rings are inside the outer-ring. An inner-ring may touch the outer-ring at a single point within a tolerance.

System 100 and/or geometry engine 150 may validate a composite surface. A composite surface may be defined as a contiguous area formed as a composition of M non-overlapping polygons. The polygons may or may not be in the same plane. The validation of a composite surface may involve processing a number of rules. The rules may include, for example, a validity of polygons test, a non-overlapping but edge-sharing nature test, and a contiguous area test. The validity of polygons test validates when the M polygons in the composite surface are valid polygons. The non-overlapping but edge-sharing nature test validates when no two polygons $P_i$ and $P_j$ overlap. For example, if two polygons $P_i$ and $P_j$ are in the same plane, the area of intersection of the two polygons is zero. However, two polygons may touch, within a tolerance, in a part of a line or edge. The contiguous area test validates when every polygon in the composite surface is reachable from any other polygon in the composite surface by appropriate tracing of the shared parts of edges.

The following section describes how a polygon with inner rings may be decomposed into a composite surface. A polygon P with an outer ring $P_o$ and non-overlapping inner rings $P_{i1}, \ldots, P_{in}$ can be decomposed into a composite surface S where polygons have no inner rings. The composite surface S has the following characteristics: every edge/vertex in polygon P is an edge in one of the polygons of S, Area(P)=Union of Area(Q) for all Q in S, and no polygon of S has an inner ring. Every edge in S: either belongs to P and is traversed only once in S, or is an edge inside the outer ring $P_o$ and is traversed twice.

The following inductive proof provides information upon which example validation rules can be based. Let n=1. The polygon P has one inner ring. On the inner ring find the two extreme (min, max) points $I_{min}$, $I_{max}$ along a specific axis of the plane of the polygon. Extend the min, max points along the dimension to meet the outer ring O of the polygon at $O_{min}$, $O_{max}$. The polygon P is now $P_1$ and $P_2$: the new edges $<O_{min}, I_{min}>$ and $<O_{max}, I_{max}>$ are traversed twice: once in $P_1$ and another time in reverse direction in $P_2$. All other edges belong to P and are in either $P_1$ or $P_2$. The new edges do not cross any other edges, as $O_{min}$ and $I_{min}$ are the extreme vertices. Hence $P_1$ and $P_2$ are valid polygons.

Let n=m−1. Consider a polygon P with m inner rings. Sort the rings along a specific axis of the plane and find the ring that has a vertex with the minimum value on this axis (e.g., closest to the outer ring). Connect the vertex to either side of the outer ring along this axis. This "cutting line" cuts some inner rings (at least 1), for these rings identify the first and the last vertex along the cutting line for the ring. These vertices are the end points for that inner ring and are connected to other rings that are cut or to the outer ring boundary. The cutting line cuts the outer ring and some inner rings into two parts. Without loss of generality, assume the cutting line cuts these rings into top and bottom halves. To identify these halves precisely for each ring r, first determine the extreme leftmost and rightmost points $v_L(r)$, $v_R(r)$ on the ring r that are also on the cutting line. The linestring $v_L(r)$ to $v_R(r)$ in counterclockwise direction determines the top half for ring r. The linestring $v_R(r)$ to $v_L(r)$ in counterclockwise direction determines the bottom half.

The linestrings of the top halves along with the new connecting edges between the rings form one polygon. Likewise, the bottom half along with the new edges in reverse direction form another polygon. For a specific ring s, the points $v_L(s)$ and $v_R(S)$ may be the same, meaning that the cutting line intersects at a point of the ring s. Then, only one of the two halves can include the ring, the other half will just include the point. If the cutting line cuts at multiple points in a ring q, then $v_L(q)$ will be the leftmost and $v_R(q)$ will be the rightmost. The remaining inner rings that are not cut by the cutting line are split between $P_1$ and $P_2$ depending on which outer ring (of $P_1$ or $P_2$) that they are inside. Since there is at least 1 inner ring that is split, $P_1$ and $P_2$ have at most m−1 rings. The inner rings are non-overlapping in P, so they are still non-overlapping in $P_1$ and $P_2$. The cutting line does not cut the inner rings of $P_1$ and $P_2$. Therefore, they still do not touch the exterior rings of $P_1$ or $P_2$. The only new edges in $P_1$ or $P_2$ are the "new edges." These new edges are traversed once in one direction in $P_1$. The other edges also existed in P and are traversed once in the same direction as in P. Since there is at least one inner ring that is split in this process, the polygons that are formed have at most m−1 inner rings. Two composite surfaces result, one for the top half and another for the bottom half. A combination of these two composites, is also a composite surface. As mentioned above, information in this inductive proof provides the basis for example validation rules described herein.

Solids encompass simple solids and composite solids. A simple solid is defined as a single volume bounded on the exterior by one exterior composite surface and on the interior by zero or more interior composite surfaces. To demarcate the interior of the solid from the exterior, the polygons of the boundary are oriented so that their normal vectors point outward from the solid. In addition, polygons of the composite surfaces have an outer ring but no inner ring. System 100 and/or geometry engine 150 may validate a simple solid. The validation may involve processing a number of rules. The rules may include, for example, a single volume check, an inner-outer check, an orientation check, an element check, and a no inner rings in polygons check.

The single volume check may require that the volume of the simple solid be contiguous. The single volume check may include a closedness test and a connectedness test. The closedness test validates when the boundary is closed. The boundary is closed when the vector sum of the edges in the boundary traversal is zero, meaning that edges on the boundary are traversed an even number of times. The connectedness test validates when the volume is connected. This means that components of the solid are reachable from other components.

The inner-outer check may include an inside test and a no-intersect test. The inside test validates when surfaces marked as inner boundaries are inside the solid defined by the exterior boundary. The no-intersect test validates when inner boundaries do not intersect. Inner boundaries, however, may touch under the condition that the solid remains connected. The orientation check validates when the polygons in the surfaces are oriented so that the normals of the polygons point outward from the solid that they bound. In one example, the normal of a planar surface is defined by the right-hand thumb rule. The volume bounded by an exterior boundary is computed as a positive value if faces are oriented so that normals are pointing away from the solid. Similarly, the volume bounded by an interior boundary is computed as a negative value. The element check validates when surfaces are valid surfaces. The no inner rings in polygons check validates when there are no inner rings in the composite surface of a solid.

The following theorem and proof provide the basis for some example validation rules described herein. A valid solid S where polygons have inner rings can also be represented as a simple solid without inner rings in the faces. Consider a polygon P that has interior rings in S. During a traversal of P, every edge of P is traversed once. These edges are traversed a second time in the traversal of the rest of the polygons that close the solid. Replace polygon P, which has interior rings in S, by its equivalent composite surface, which includes the no-interior polygons $P_1, \ldots, P_k$. Since every edge in P is traversed only once during traversal of $P_1, \ldots, P_k$, the boundary is preserved. Edges that are in $P_1, \ldots, P_k$ but not in P are traversed twice in opposite directions and are cancelled out in the traversal, thus preserving the solid closedness properties. Other properties are also preserved. A composite solid is a combination of n simple solids. Compared to the simple solid definition, this allows the overlap of the polygons of different simple solids with a still closed boundary. This does not allow overlapping polygons in the same simple solid but only across multiple simple solids.

The following theorem and proof provide the basis for example validation rules described herein. A valid composite solid can also be represented as a simple solid. A composite solid has solids attached to each other via partially or fully shared faces. Having detected these shared faces, these faces can be removed to redefine the solid without these shared areas. System 100 and/or geometry engine 150 may validate a composite solid. The validation may involve processing a number of rules. The rules may include, for example, a component validity test, a shared face but not volume intersection test, and a connectedness test. The component validity test validates when simple solid components of a composite solid are valid. The shared face but no volume intersection test validates when intersection of simple solids components of a composite solid is zero volume. The connectedness test validates when the volume of the composite solid is contiguous, meaning that a point in one component may be reached from another component without going out of the composite solid.

Collections can be either homogeneous or heterogeneous. A homogeneous collection is a collection of elements where all elements are of the same type. A homogeneous collection can be either a multi-point, multi-line, multi-surface, or multi-solid corresponding to the element types point, line, surface and solid. System 100 and/or geometry engine 150 may validate a homogeneous collection. The validation may involve processing a number of rules. The rules may include, for example, an elements test, a validity test, and a disjointness for multi-solid test. The elements test validates when elements are of the same type and conform to the homogeneous collection type (multi-point, multi-line, multi-surface, multi-solid). The validity test validates when elements of the homogeneous collection are valid. The disjointness for multi-solid test validates when multi-solid elements are disjoint. Disjointness means no-volume intersection and no-area intersection.

In a heterogeneous collection, the elements can be a mixture of different types. For example, a building (simple solid) with the windows/doors (surfaces) can be modeled as a heterogeneous collection. System 100 and/or geometry engine 150 may validate a heterogeneous collection. The validation may involve processing rules including a test that may validate when elements of the heterogeneous collection is valid.

After storing different types of geometries using instances of the open data type 170, users of the three dimensional spatial system 100 can create a spatial index 160. The spatial index 160 can be based on geometric characteristics of three dimensional objects. Indexing may include creating multiple indexes. In one example, the indexes may be in R-tree format. The spatial index 160 may facilitate interacting with database 180. For example, spatial index 160 may facilitate accessing a spatial column in database 180. Creating a spatial index facilitates handling queries interested in three dimensional object properties.

Example queries may be an intersection query, a within distance query, and a nearest neighbor query. Recall that an instance of an SDO_GEOMETRY may be referred to as a "geometry". Given a geometry as the query object, an intersection query may identify geometries that intersect the query object. Given a geometry as the query object and a distance d, a within distance query may identify geometries that are within distance d of the query object. Given a geometry as the query object and the number k, a nearest neighbor query may identify k geometries that are neighbors of the query object. In one example, the nearest neighbor query may have a provision for specifying non-spatial predicates such as "building type is office" to identify the k office type buildings from a buildings table.

These queries may require the table being queried to have a spatial index 160. Using index 160, the queries may be processed in a two-stage filter and refine approach. Using three dimensional minimum bounding volumes (MBVs) in the spatial index 160, candidate geometries that may satisfy a query window are first identified. Candidates may then be sent to the geometry engine 150 to refine and identify the final result. This two-step filtering mechanism allows relatively high resource consuming geometry engine operations to be performed on a few candidate geometries and uses the fast-filtering power of the spatial index 160 to weed out irrelevant candidates.

The three dimensional spatial system 100 may also include a three dimensional (3-D) gateway 125. 3-D gateway 125 may facilitate the conversion of three dimensional object representations in the open data type 170 to and from external formats. Therefore, the three dimensional spatial system 100 may accept and output geography markup language (GML) data types that conform to the GML 3.1.1 standard using a GML converter 130. The GML converter 130 may also convert from J3D_GEOMETRY to GML 3.1.1 format and vice-versa. A person having ordinary skill in the art would recognize that GML and J3D_GEOMETRY are mentioned as examples and are not an exhaustive list of possible formats for conversion. For example, other external formats may include CityGML. The conversion functions of the GML converter may be implicitly invoked in a Web Services 120 framework and/or by use of a Service Oriented Architecture (SOA) Interface 115.

The 3-D gateway 125 may also facilitate access to sub-elements of the open data type 170 through a Java Iterator class. One example Java Iterator class may be referred to as an element extractor 140. The element extractor 140 may access sub-elements of three dimensional geometry objects. By specifying parameters, three dimensional geometries can be decomposed into simpler geometries formed from its sub-elements.

The three dimensional spatial system 100 may facilitate accessing and manipulating three dimensional geometry object data via one or more interfaces (e.g., SQL 105, Java Database Connectivity (JDBC) 110, Service Oriented Architecture (SOA) 115, Web Services 120).

Figure 2:
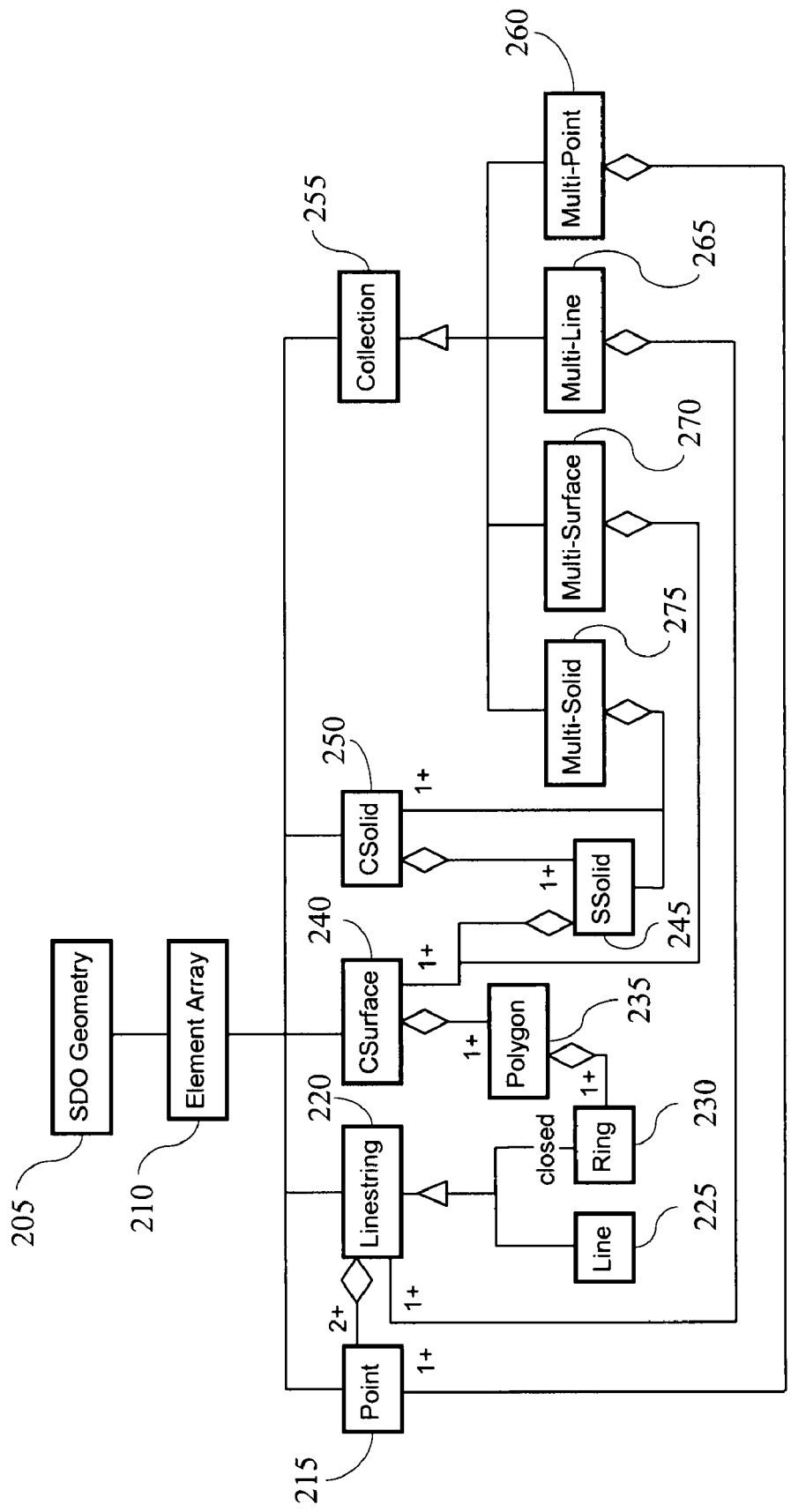
FIG. 2 illustrates an example class structure for a data type that may be used to store data representing a three dimensional geometry object in a spatial system and an RDBMS.

FIG. 2 illustrates an example class structure diagram for a data type that may be used to store data representing a three dimensional geometry object in a spatial reference system. The spatial reference system may be a three dimensional spatial engine associated with a relational database management system (RDBMS). In the example illustrated in FIG. 2, the data type is named SDO_GEOMETRY 205. The SDO_GEOMETRY 205 may include an array 210 of elements to store data representing the spatial features of a three dimensional geometry object. The element array 210 may store data to represent spatial elements described above (e.g., a point 215, a linestring 220, a surface 240, a solid 250, a collection 255). The collection may be a heterogeneous collection or a homogenous collection (e.g., multi-point 260, multi-line 265, multi-surface 270, multi-solid 275).

Two or more points 215 form a linestring 220. An open linestring 220 is called a line 225. A closed linestring 220 is called a ring 230. One or more rings 230 (1 outer and zero or more inner rings) within the same plane form a polygon 235. One or more polygons 235 form a surface 240, called a composite surface if it has more than 1 polygon and the surface is connected via shared parts of edges. Two or more outer rings of a composite surface 240 can be on the same or different planes. One outer surface and zero or more inner surfaces (represented as 1 or more in FIG. 2) form a simple solid 245, which is referred to as SSolid 245 in FIG. 2, if all the involved surfaces bound a closed volume. One or more adjacent (e.g., sharing at least a two dimensional part of a face) simple solids 245 form a composite solid 250, which is referred to as CSolid 250 in FIG. 2. A composite solid 250 can be represented as a simple solid 245 by removing shared polygons. The collection types 255 are formed as elements of an appropriate type. One or more points 215 form a multi-point 260, one or more linestrings 220 form a multi-line 265, one or more surfaces 240 form a multi-surface 270 and one or more solids (e.g., SSolid 245, CSolid 250) form a multi-solid 275.

The SDO_GEOMETRY 205 may be realized in a database as an object type with attributes including a geometry type, a coordinate system identifier, an array of ordinates, and an array of element descriptors. In one example, the geometry type may be stored in an SDO_GTYPE attribute. This attribute specifies the type of three dimensional geometry. In one example, the type may be a point, a line, a surface, a solid, a heterogeneous collection, or a homogeneous collection (e.g., multi-point, multi-line, multi-surface, multi-solid). In another example, the coordinate system identifier may be stored in an SDO_SRID attribute. This attribute specifies the coordinate system or spatial reference for the geometry. Different types of coordinate systems may be supported including local, geocentric 3-D, geographic 3-D, and compound systems. Local refers to coordinate systems that are specific to an application. Geocentric 3-D refers to three dimensional Cartesian coordinate systems. Geographic 3-D refers to coordinate systems that perform calculations on the three dimensional ellipsoidal data that represent the terrestrial surface. Compound refers to coordinate systems that combine Geographic 2-D systems (e.g., projected, geodetic) with vertical coordinate systems that measure height from a reference point (e.g., sea level). Whereas the local coordinate systems can be used in any application, the rest are typically used to model data on the surface of the Earth (e.g., buildings in a city model). Since the Earth's surface is not an exact geometric shape, different data and the associated coordinate systems use ellipsoids to maximize the accuracy for specific regions and specific tasks (e.g., area computations, distance computations). The spatial system may support a set of three dimensional coordinate systems that are based on the European Petroleum Standard Group's (EPSG) model.

In one example, an array of ordinates may be stored in an SDO_ORDINATES attribute. This attribute represents an array for storing the ordinates (e.g., x, y, z) of the vertices of the three dimensional geometry. In another example, an array of element descriptors may be stored in an SDO_ELEM_INFO attribute. This attribute represents an array of element descriptors describe how to connect the ordinates stored in the SDO_ORDINATES attribute. SDO_ELEM_INFO may contain a set of triplets, where a triplet defines a sub element of a geometry. Triplets consist of a starting offset in the SDO_ORDINATES array for the element, a sub element type (e.g., composite surface, polygon), and an interpretation or shape descriptor of the sub element. The SDO_ELEM_INFO attribute may also be conceptualized as a set of simpler elements that when assembled according to the types of sub elements and the SDO_ORDINATES attribute, form the three dimensional geometry object.

The following SQL shows the constructor for an example composite surface geometry that includes two (axis-aligned) rectangle polygons:

---

SDO_GEOMETRY (
   3003, -- SDO_GTYPE: 3-Dimensional surface type geometry
   NULL, NULL, -- SDO_SRID for coordinate system ID
   SDO_ELEM_INFO_ARRAY ( -- SDO_ELEM_INFO constructor
     1, --- starting offset for element
     1006, -- Element type is a composite surface
     2, --- Number of primitive polygon elements making up the composite surface
     1, -- starting offset of first polygon of Composite surface

```
    1003, -- Polygon element type
    3, -- Axis-aligned rectangle specified by two corners
    7, -- starting offset of second polygon of Composite
surface
    1003, -- Polygon element type
    3 -- Axis aligned rectangle specified by two corners,
    )
    SDO_ORDINATE_ARRAY ( --- Constructor for
    SDO_ORDINATES:
        --- Store the actual ordinates of the vertices
        2, 0, 2, -- First corner of first rectangle polygon
        4, 2, 2, -- Second corner of first rectangle polygon
        2, 0, 2, -- First corner of second rectangle polygon
        4, 0, 4 -- Second corner of second rectangle polygon
    )
)
```

In one example, data structures may be constructed that facilitate storing data on a computer-readable medium and/or in a data store. Thus, in one example, a computer-readable medium may store a data structure that includes the fields described above. While a number of fields are described, it is to be appreciated that a greater and/or lesser number of fields could be employed.

Examining spatial server 100 described in FIG. 1 and the data type 205 described in FIG. 2 reveals a three dimensional spatial engine in an RDBMS. The spatial engine interacts with an open geo-referenced data type for storing three dimensional models. The combination provides for efficient and scalable storage, management, and querying of three dimensional geometries in a database.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

Figure 3:
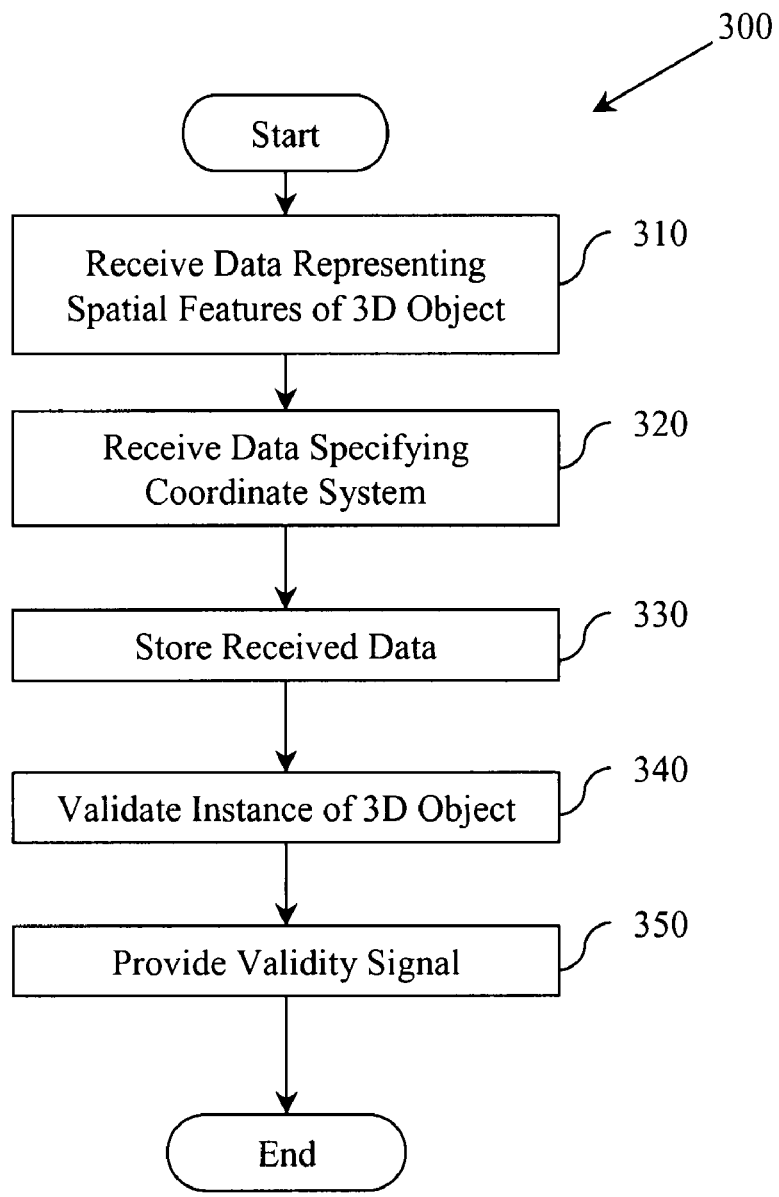
FIG. 3 illustrates an example method associated with a three dimensional spatial engine associated with an RDBMS.
Figure 4:
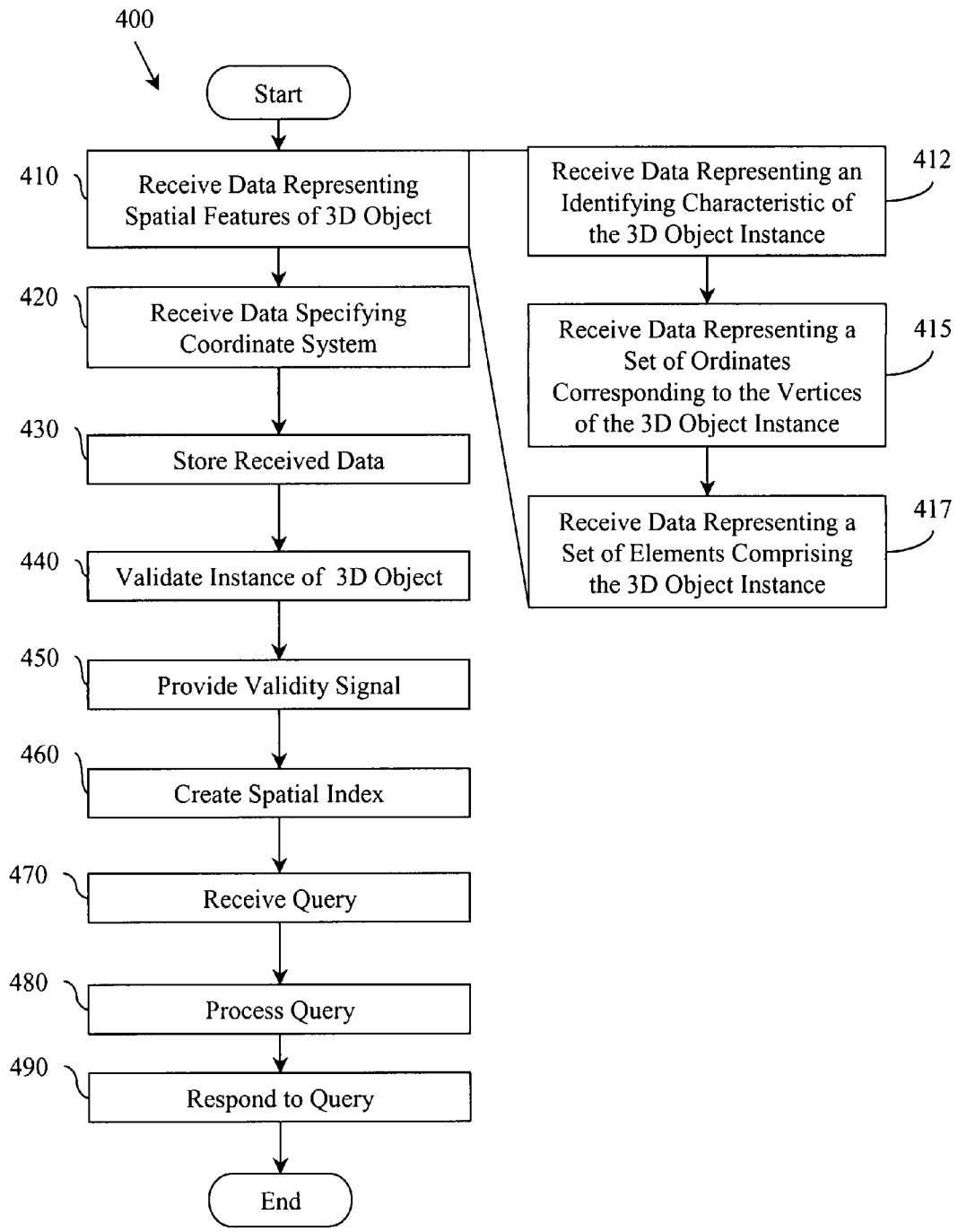
FIG. 4 illustrates an example method associated with a three dimensional spatial engine associated with an RDBMS.

FIG. 3 and FIG. 4 illustrate example methods associated with a three dimensional spatial engine in an RDBMS. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methods may be implemented as processor executable instructions and/or operations provided by a computer-readable medium. In another example, the processing blocks may represent functions and/or actions performed by functionally equivalent circuits (e.g., analog circuit, digital signal processor circuit (DSP), application specific integrated circuit (ASIC)).

It will be appreciated that electronic and software applications may involve dynamic and flexible processes. Thus, the illustrated blocks can be performed in sequences different than the one shown and/or blocks may be combined or separated into multiple components. Blocks may also be performed concurrently, substantially in parallel, and/or at substantially different points in time. They may also be implemented using various programming approaches (e.g., machine language, procedural, object oriented, artificial intelligence techniques).

FIG. 3 illustrates a method 300 associated with a three dimensional spatial engine in an RDBMS. Method 300 may include, at 310, receiving data representing a set of spatial features of an instance of a three dimensional object. The data may be stored, for example, in a geometry object of type SDO_GEOMETRY. Method 300 may also include, at 320, receiving data specifying a coordinate system for the instance of the three dimensional object. This data may be stored, for example, in an SDO_SRID attribute of a geometry. The data received may be stored at 330. Method 300 may also include, at 340, validating the instance of the three dimensional object. Validating the object may include evaluating the received data in light of a set of type specific rules similar to those described above. After determining validity, method 300 may provide, at 350, a signal concerning the validity of the three dimensional object.

FIG. 4 illustrates a method 400 associated with a three dimensional spatial engine in an RDBMS. Method 400 may include, at 410, receiving data representing a set of spatial features of an instance of a three dimensional object. Receiving this data at 410 may include, at 412, receiving data representing an identifying characteristic of the instance of the three dimensional object. The identifying characteristic may indicate the type of three dimensional geometry represented. The type may be, for example, a point, a line, a surface, a solid, a heterogeneous collection, a homogeneous collection (e.g., multi-point, multi-line, multi-surface, multi-solid) and so on. Receiving the data at 410 may also include, at 415, receiving data representing a set of ordinates (e.g., x, y, z) corresponding to the vertices of the instance of the three dimensional object. Receiving the data at 410 may also include, at 417, receiving data representing the set of elements composing the instance of the three dimensional object. The elements may be, for example, a set of rectangles forming a solid.

Method 400 may also include, at 420, receiving data specifying a coordinate system and, at 430, storing the received data. Method 400 may also include, at 440, validating the instance of the three dimensional object and, at 450, providing a signal concerning the validity of the object. Method 400 may also create a spatial index at 460. Data associated with the object received at 410 may be stored in the spatial index. With the spatial index available, method 400 may also process queries concerning 3-D geometry objects. Thus, method 400 may include, at 470, receiving a query concerning an object. In response to the query, method 400 may compute the length, surface area, volume, and so on, of the three dimensional object at 480. Additionally, method 400 may extrude a two dimensional representation of a three dimensional object to a three dimensional representation. Having performed an action in response to the query, method 400 may respond to the query at 490. Responding to the query may include, for example, providing a signal, storing a value, displaying a value, and so on.

While FIG. 3 and FIG. 4 illustrate various actions occurring in serial, it is to be appreciated that various actions illustrated in FIG. 3 and FIG. 4 could occur substantially in parallel. While a number of processes are described, it is to be appreciated that a greater and/or lesser number of processes could be employed and that lightweight processes, regular processes, threads, and other approaches could be employed.

Figure 5:
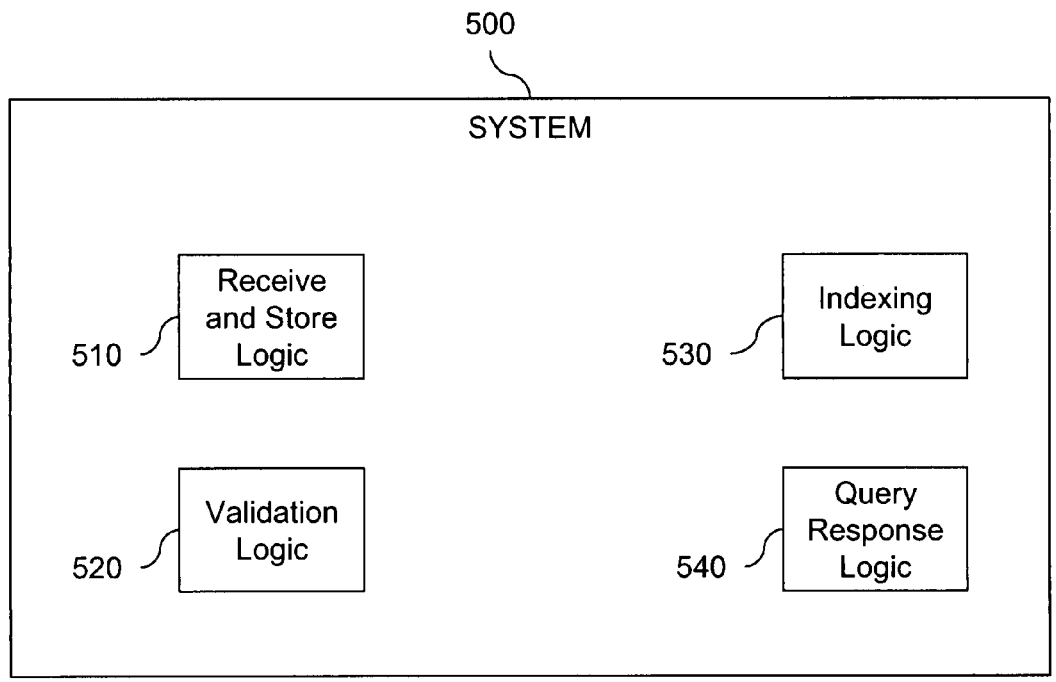
FIG. 5 illustrates an example three dimensional spatial engine in an RDBMS.

FIG. 5 illustrates a three dimensional spatial system 500. System 500 may be, for example, a three dimensional spatial engine in an RDBMS. System 500 may include a first logic 510 to receive and store data representing geometric characteristics of a three dimensional object. First logic 510 may store the data as an instance of an SDO_GEOMETRY object in a database. System 500 may also include a second logic 520 to validate the three dimensional object based on the data received and stored, and a set of validation rules as described above. System 500 may also include a third logic 530 to index the data. Logic 530 may index the data as an R-tree. The index may be, for example, a spatial index. The system 500 may also include a fourth logic 540 to respond to queries concerning the indexed data. The queries may concern, for example, spatial relationships between three dimensional objects.

Figure 6:
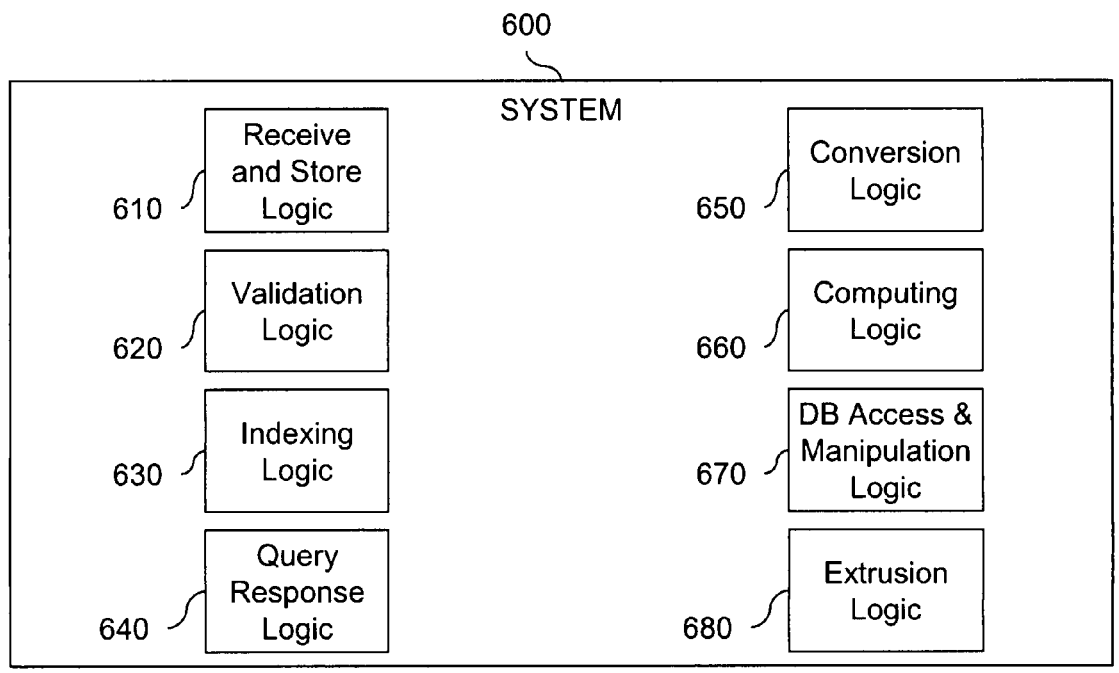
FIG. 6 illustrates an example three dimensional spatial engine in an RDBMS.

FIG. 6 illustrates a three dimensional spatial system 600. Spatial system 600 may be a three dimensional spatial engine associated with a relational database management system (RDBMS). System 600 may include a receive and store logic 610, a validation logic 620, an indexing logic 630, and a query response logic 640 similar to logics described in connection with system 500 (FIG. 5). System 600 may also include a conversion logic 650 to convert data representing the geometric characteristics of the three dimensional object to and from a set of external data formats. The set of external data formats may include, for example, GML3, CityGML, and so on. System 600 may also include a computing logic 660 to compute geometric characteristics of the three dimensional object including, for example, length, surface area, volume, and so on. System 600 may also include a database access and manipulation logic 670 to access and manipulate the database via various interfaces including, for example, SQL, Java Database Connectivity (JDBC), Service Oriented Architecture (SOA), Web Services, and so on. System 600 may also include an extrusion logic 680 to extrude a two dimensional geometry representation of the three dimensional object into a three dimensional geometry representation. The extrusion logic 680 may receive the heights of the vertices of the three dimensional geometry object and extrude the two dimensional geometry representation into a three dimensional geometry representation by adding the received heights as a third dimension.

Figure 7:
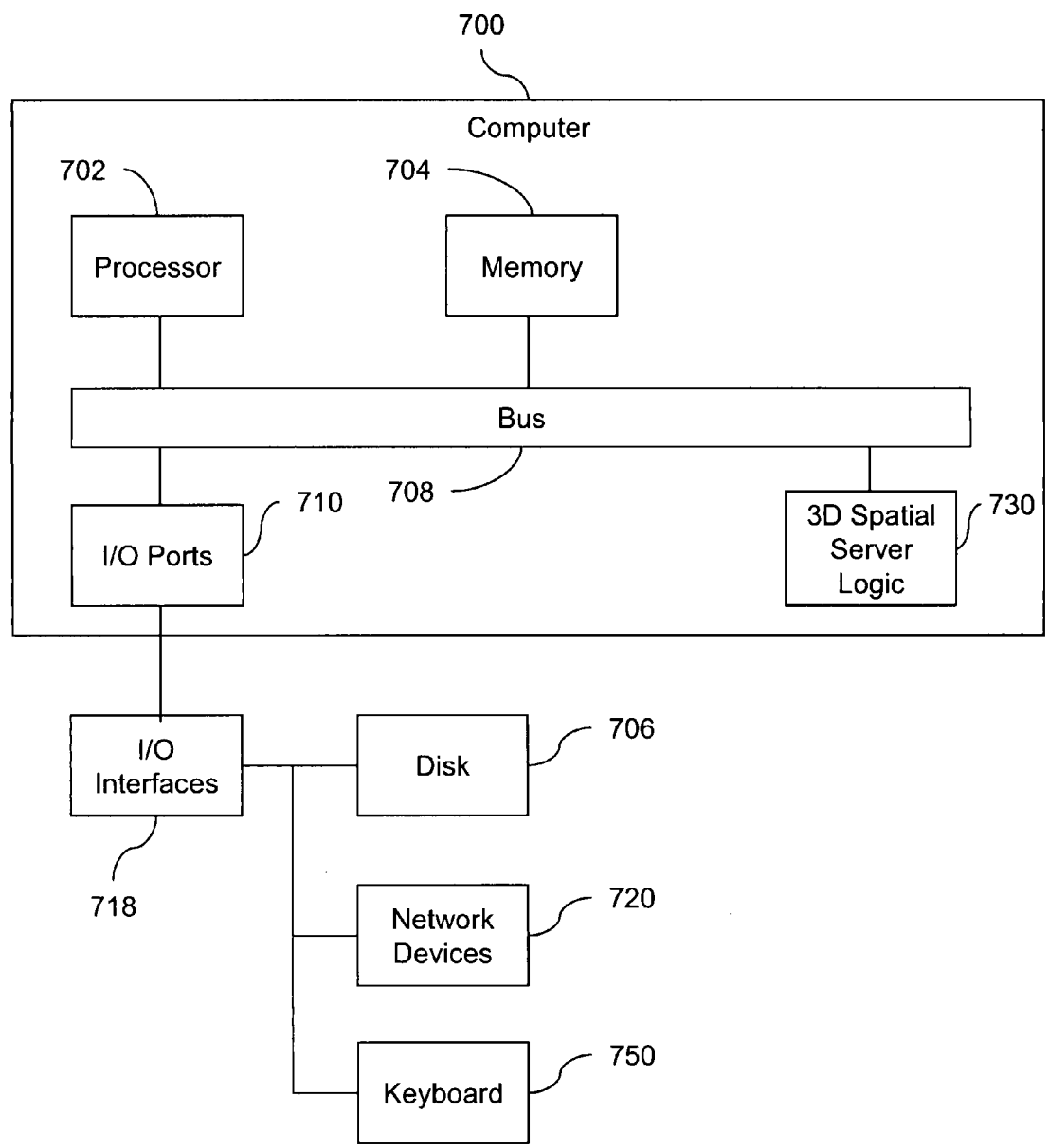
FIG. 7 illustrates an example computing environment in which example systems and methods illustrated herein can operate.

FIG. 7 illustrates an example computing device in which example systems and methods described herein, and equivalents, can operate. The example computing device may be a computer 700 that includes a processor 702, a memory 704, and input/output ports 710 operably connected by a bus 708. In one example, the computer 700 may include a three dimensional spatial server logic 730 to facilitate receiving and storing data representing spatial features of a three dimensional object. Spatial server logic 730 may also validate data concerning a three dimensional object and control computer 700 to provide a signal concerning the validity of the object. Computer 700 may store data representing the spatial features and other information regarding the three dimensional geometry object in a database.

Generally describing an example configuration of the computer 700, the processor 702 can be a variety of various processors including dual microprocessor and other multi-processor architectures. The memory 704 can include volatile memory and/or non-volatile memory. The non-volatile memory can include, but is not limited to, ROM, PROM, EPROM, and so on. Volatile memory can include, for example, RAM, synchronous RAM (SRAM), dynamic RAM (DRAM), and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. The disk 706 and/or memory 704 can store an operating system that controls and allocates resources of the computer 700.

The bus 708 can be a single internal bus interconnect architecture and/or other bus or mesh architectures. While a single bus is illustrated, it is to be appreciated that computer 700 may communicate with various devices, logics, and peripherals using other busses that are not illustrated (e.g., PCIE, SATA, Infiniband, 1394, USB, Ethernet).

The computer 700 may interact with input/output devices via i/o interfaces 718 and input/output ports 710. Data representing the spatial and other characteristics of a three dimensional geometry object may be inputted via these input/output devices. Input/output devices can include, but are not limited to, a keyboard 750, a microphone, a pointing and selection device, cameras, video cards, displays, disk 706, network devices 720, and so on. The input/output ports 710 can include but are not limited to, serial ports, parallel ports, and USB ports.

The computer 700 can operate in a network environment and thus may be connected to network devices 720 via the i/o devices 718, and/or the i/o ports 710. Through the network devices 720, the computer 700 may interact with a network. Through the network, the computer 700 may be logically connected to remote computers. The networks with which the computer 700 may interact include, but are not limited to, a local area network (LAN), a wide area network (WAN), and other networks. The network devices 720 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 720 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method comprising:
   receiving data representing a set of spatial features of an instance of a three dimensional geometry object;
   storing the data in a memory;
   validating the instance of the three dimensional geometry object based, at least in part, on the data representing the set of spatial features and a set of validation rules; and
   storing a value in the memory concerning the validity of the instance of the three dimensional geometry object.

2. The method of claim 1, where receiving data representing the set of spatial features includes:
   receiving data representing an identifying characteristic of the instance of the three dimensional geometry object;
   receiving data representing a set of ordinates corresponding to vertices of the instance of the three dimensional geometry object; and
   receiving data representing a set of elements in the instance of the three dimensional geometry object.

3. The method of claim 2, the set of elements comprising:
   an offset number representing a starting point in the set of ordinates corresponding to an element in the set of elements;
   an identifying characteristic of the element, where the identifying characteristic identifies a geometric classification of the element; and
   an interpretation of the element, where the interpretation identifies a geometric shape of the element.

4. The method of claim 1, including receiving and storing data specifying a coordinate system for the instance of the three dimensional geometry object, the coordinate system being one of:
   an application specific local coordinate system;
   a geocentric three dimensional Cartesian coordinate system;
   a three dimensional geographic coordinate system for performing calculations on three dimensional ellipsoidal data for representing the surface of the earth; and
   a compound coordinate system that combines a two-dimensional geographic coordinate system with a vertical coordinate system that measures height.

5. The method of claim 1, further comprising receiving a query, where processing the query includes extruding a two-dimensional representation of the three dimensional geometry object to a three dimensional representation by incorporating received heights of vertices of the three dimensional geometry object.

6. The method of claim 1, where the set of validation rules includes a rule to invalidate a ring upon determining one or more of:
   that a first vertex and a last vertex of the ring do not correspond to the same point in space;
   that all vertices of the ring are not on the same plane;
   that edges of the ring intersect; and
   that adjacent vertices of the ring represent the same point in space.

7. The method of claim 1, where the set of validation rules includes a rule to invalidate a polygon comprising an outer ring and a set of inner rings upon determining one or more of:
   that one or more rings in the polygon are invalid;
   that the one or more rings in the polygon are not on the same plane;
   that a member of the set of inner rings does not have the opposite orientation as that of an outer ring;
   that the set of inner rings and the outer ring do not define a single area;
   that two or more members of the set of inner rings overlap;
   that a member of the set of inner rings is not inside the outer ring; and
   that one or more members of the set of inner rings touch the outer ring at multiple points.

8. The method of claim 1, where the set of validation rules includes a rule to invalidate a composite surface comprising a set of polygons upon determining one or more of:
   that one or more polygons in the composite surface are invalid;
   that two polygons in the composite surface overlap; and
   that a first polygon in the composite surface is not reachable from a second polygon in the composite surface by tracing edges shared between the first polygon and the second polygon.

9. The method of claim 1, where the set of validation rules includes a rule to invalidate a simple solid upon determining one or more of:
   that a boundary of the simple solid is not closed;
   that a vector sum of edges in the boundary of the simple solid is not zero;
   that a volume enclosed by the simple solid is not connected;
   that not every interior boundary is inside the simple solid defined by an exterior boundary of the simple solid;
   that one or more first interior boundaries intersect one or more second interior boundaries;
   that one or more polygons in one or more of the surfaces of the simple solid are not oriented with the normals of the polygons pointing away from the simple solid bounded by the one or more polygons;
   that a surface of the simple solid is an invalid surface; and
   that a composite surface in the simple solid contains inner rings.

10. The method of claim 1, where the set of validation rules includes, a rule to invalidate a composite solid comprising a set of simple solids upon determining one or more of:
    that one or more simple solids in the composite solid are invalid;
    that two intersecting simple solids in the composite solid share volume; and
    that the volume of the composite solid is not contiguous.

11. The method of claim 1, where the set of validation rules includes a rule to invalidate a homogeneous collection comprising a set of elements upon determining one or more of:
    that not all elements of the homogeneous collection are of the same type;
    that one or more elements of the homogeneous collection are of a type other than point, line, surface, and solid; and
    that one or more elements of the homogeneous collection are invalid.

12. The method of claim 1, where the set of validation rules includes a rule to invalidate a heterogeneous collection comprising a set of elements upon determining that an element of the heterogeneous collection is invalid.

13. A system, comprising:
a non-transitory computer-readable medium having stored instructions that implement at least in part:
   a first logic configured to receive and store a set of data representing one or more geometric characteristics of a three dimensional object;
   a second logic configured to determine the validity of validate the three dimensional object based on the set of data and a set of validation rules and store a validity value based on the validity of the three dimensional object;
   a third logic configured to index the set of data in a spatial index; and
   a fourth logic configured to respond to a query associated with a set of spatial relationships that, in part, define the three dimensional object and a second three dimensional object, where the query requests to access data associated with the spatial relationships using the spatial index, identify a first set of geometries from the spatial index for the three dimensional object and the second three dimensional object, and decompose the first set of geometries into a second set of geometries from the spatial index based, at least in part, on the query,
where the first logic, second logic, third logic, and fourth logic collectively provide a three dimensional spatial engine for a relational database management system.

14. The system of claim 13, where the set of data includes one or more of:
   a geometry identifier for identifying a type of geometry of the three dimensional object;
   a group of ordinates identifying vertices of the three dimensional object; and
   a set of sub-elements that when assembled according to the type of geometry and the group of ordinates form the three dimensional object.

15. The system of claim 14, the set of sub-elements comprising:
   an offset in the group of ordinates, the offset representing the start of the ordinates corresponding to a sub-element within the set of sub-elements;
   a sub-element geometry identifier, the sub-element geometry identifier identifying a type of geometry of the sub-element represented by the offset; and
   a shape descriptor, the shape descriptor describing the shape of the sub-element.

16. The system of claim 13, including a fifth logic to convert the set of data to and from a set of external data formats.

17. The system of claim 16, where the set of external data formats includes one or more of, GML3, and CityGML.

18. The system of claim 13, where the third logic indexes the set of data as an R-tree.

19. The system of claim 13, including a sixth logic to compute one or more of, the length, the surface area, and the volume, of the three dimensional object.

20. The system of claim 13, where the first logic stores the set of data in a database.

21. The system of claim 20, including a seventh logic to access the database via one or more of SQL, Java Database Connectivity (JDBC), Service Oriented Architecture (SOA), and Web Services.

22. The system of claim 13, including an eighth logic to extrude a two dimensional geometry representation to a three dimensional geometry representation by receiving the heights of vertices of three dimensional geometry object and adding the received heights to the two dimensional geometry representation as a third dimension.

23. The system of claim 13, the query being one of:
   an intersection query to identify an intersection between the three dimensional object and a second three dimensional object;
   a distance query to identify a second three dimensional object that is within a specified distance of the three dimensional object; and
   a nearest query to identify a second three dimensional object that is nearest to the three dimensional object.

24. A non-transitory computer-readable medium storing processor executable instructions that when executed by a computer cause the computer to perform a method, the method comprising:
   receiving and storing data representing a set of spatial features of an instance of a three dimensional geometry object;
   validating the instance of the three dimensional geometry object based, at least in part, on the data representing the set of spatial features and a set of validation rules;
   storing a value in the memory concerning the validity of the instance of the three dimensional geometry object;
   in response to receiving a query associated with the three dimensional geometry object:
      identifying a first set of geometries from the spatial index for the three dimensional geometry object;
      decomposing the first set of geometries into a second set of geometries from the spatial index based, at least in part, on the query;
      computing a length of the three dimensional geometry object, a surface area of the three dimensional geometry object, or a volume of the three dimensional geometry object based on the second set of geometries; and
   providing a result to the query based, at least in part, on the computation.

25. A non-transitory computer-readable medium storing processor executable instructions that when executed by a computer cause the computer to perform a method, the method comprising:
   providing a three dimensional spatial engine for a relational database management system, by:
      storing a set of data representing one or more geometric characteristics of a three dimensional object;
      validating the three dimensional object based on the set of data and a set of validation rules;
      storing a value in the memory concerning the validity of the instance of the three dimensional object;
      indexing the set of data in a spatial index; and
      in response to receiving a query, determining if the query involves a set of spatial relationships concerning the three dimensional object and a second three dimensional object; and
      if the determination is true, processing the query, where processing the query comprises:
         accessing data associated with the spatial relationships using the spatial index;
         identifying a first set of geometries from the spatial index for the three dimensional object and the second three dimensional object;
         decomposing the first set of geometries into a second set of geometries from the spatial index based, at least in part, on the query; and
         providing a result to the query.

26. The method of claim 1, further comprising:
if the data is valid, creating a spatial index to index the data representing the sets of spatial features;
in response to receiving a query associated with the three dimensional geometry object:
identifying a first set of geometries from the spatial index for the three dimensional geometry object;
decomposing the first set of geometries into a second set of geometries from the spatial index based, at least in part, on the query;
computing a length of the three dimensional geometry object, a surface area of the three dimensional geometry object, or a volume of the three dimensional geometry object based on the second set of geometries; and
providing a result to the query based, at least in part, on the computation.

27. A non-transitory computer-readable medium storing processor executable instructions that when executed by a computer cause the computer to perform a method, the method comprising:
receiving data representing a set of spatial features of an instance of a three dimensional geometry object;
storing the data in a memory;
validating the instance of the three dimensional geometry object based, at least in part, on the data representing the set of spatial features and a set of validation rules; and
storing a value in the memory concerning the validity of the instance of the three dimensional geometry object.

28. The non-transitory computer-readable medium of claim 27, where receiving data representing the set of spatial features includes:
receiving data representing an identifying characteristic of the instance of the three dimensional geometry object;
receiving data representing a set of ordinates corresponding to vertices of the instance of the three dimensional geometry object; and
receiving data representing a set of elements in the instance of the three dimensional geometry object.

29. The non-transitory computer-readable medium of claim 28, the set of elements comprising:
an offset number representing a starting point in the set of ordinates corresponding to an element in the set of elements;
an identifying characteristic of the element, where the identifying characteristic identifies a geometric classification of the element; and
an interpretation of the element, where the interpretation identifies a geometric shape of the element.

30. The non-transitory computer-readable medium of claim 27, including receiving and storing data specifying a coordinate system for the instance of the three dimensional geometry object, the coordinate system being one of:
an application specific local coordinate system;
a geocentric three dimensional Cartesian coordinate system;
a three dimensional geographic coordinate system for performing calculations on three dimensional ellipsoidal data for representing the surface of the earth; and
a compound coordinate system that combines a two-dimensional geographic coordinate system with a vertical coordinate system that measures height.

31. The non-transitory computer-readable medium of claim 27, further comprising receiving a query, where processing the query includes extruding a two-dimensional representation of the three dimensional geometry object to a three dimensional representation by incorporating received heights of the vertices of the three dimensional geometry object.

32. The non-transitory computer-readable medium of claim 27, where the set of validation rules includes a rule to invalidate a ring upon determining one or more of:
that a first vertex and a last vertex of the ring do not correspond to the same point in space;
that all vertices of the ring are not on the same plane;
that edges of the ring intersect; and
that adjacent vertices of the ring represent the same point in space.

33. The non-transitory computer-readable medium of claim 27, where the set of validation rules includes a rule to invalidate a polygon comprising an outer ring and a set of inner rings upon determining one or more of:
that one or more rings in the polygon are invalid;
that the one or more rings in the polygon are not on the same plane;
that a member of the set of inner rings does not have the opposite orientation as that of an outer ring;
that the set of inner rings and the outer ring do not define a single area;
that two or more members of the set of inner rings overlap;
that a member of the set of inner rings is not inside the outer ring; and
that one or more members of the set of inner rings touch the outer ring at multiple points.

34. The non-transitory computer-readable medium of claim 27, where the set of validation rules includes a rule to invalidate a composite surface comprising a set of polygons upon determining one or more of:
that one or more polygons in the composite surface are invalid;
that two polygons in the composite surface overlap; and
that a first polygon in the composite surface is not reachable from a second polygon in the composite surface by tracing edges shared between the first polygon and the second polygon.

35. The non-transitory computer-readable medium of claim 27, where the set of validation rules includes a rule to invalidate a simple solid upon determining one or more of:
that a boundary of the simple solid is not closed;
that a vector sum of edges in the boundary of the simple solid is not zero;
that a volume enclosed by the simple solid is not connected;
that not every interior boundary is inside the simple solid defined by an exterior boundary of the simple solid;
that one or more first interior boundaries intersect one or more second interior boundaries;
that one or more polygons in one or more of the surfaces of the simple solid are not oriented with the normals of the polygons pointing away from the simple solid bounded by the one or more polygons;
that a surface of the simple solid is an invalid surface; and
that a composite surface in the simple solid contains inner rings.

36. The non-transitory computer-readable medium of claim 27, where the set of validation rules includes, a rule to invalidate a composite solid comprising a set of simple solids upon determining one or more of:
that one or more simple solids in the composite solid are invalid;
that two intersecting simple solids in the composite solid share volume; and
that the volume of the composite solid is not contiguous.

37. The non-transitory computer-readable medium of claim 27, where the set of validation rules includes a rule to invalidate a homogeneous collection comprising a set of elements upon determining one or more of:
- that not all elements of the homogeneous collection are of the same type;
- that one or more elements of the homogeneous collection are of a type other than point, line, surface, and solid; and
- that one or more elements of the homogeneous collection are invalid.

38. The non-transitory computer-readable medium of claim 27, where the set of validation rules includes a rule to invalidate a heterogeneous collection comprising a set of elements upon determining that an element of the heterogeneous collection is invalid.

* * * * *

UNITED STATES PATENT AND TRADEMARK OFFICE
CERTIFICATE OF CORRECTION

PATENT NO. : 8,269,764 B2
APPLICATION NO. : 11/906785
DATED : September 18, 2012
INVENTOR(S) : Ravada et al.

It is certified that error appears in the above-identified patent and that said Letters Patent is hereby corrected as shown below:

On cover page, in column 2, under "Other Publications", line 3, delete ""Toological" and insert -- "Topological --, therefor.

In column 3, line 31, delete "servelet," and insert -- servlet, --, therefor.

In column 6, line 42, delete "$v_R(S)$" and insert -- $v_R(s)$ --, therefor.

In column 17, line 7-8, in Claim 13, after "of" delete "validate".

In column 17, line 65, in Claim 22, delete "of" and insert -- of the --, both occurrences, therefor.

Signed and Sealed this
Eighteenth Day of December, 2012

David J. Kappos
*Director of the United States Patent and Trademark Office*